United States Patent Office 2,699,986
Patented Jan. 18, 1955

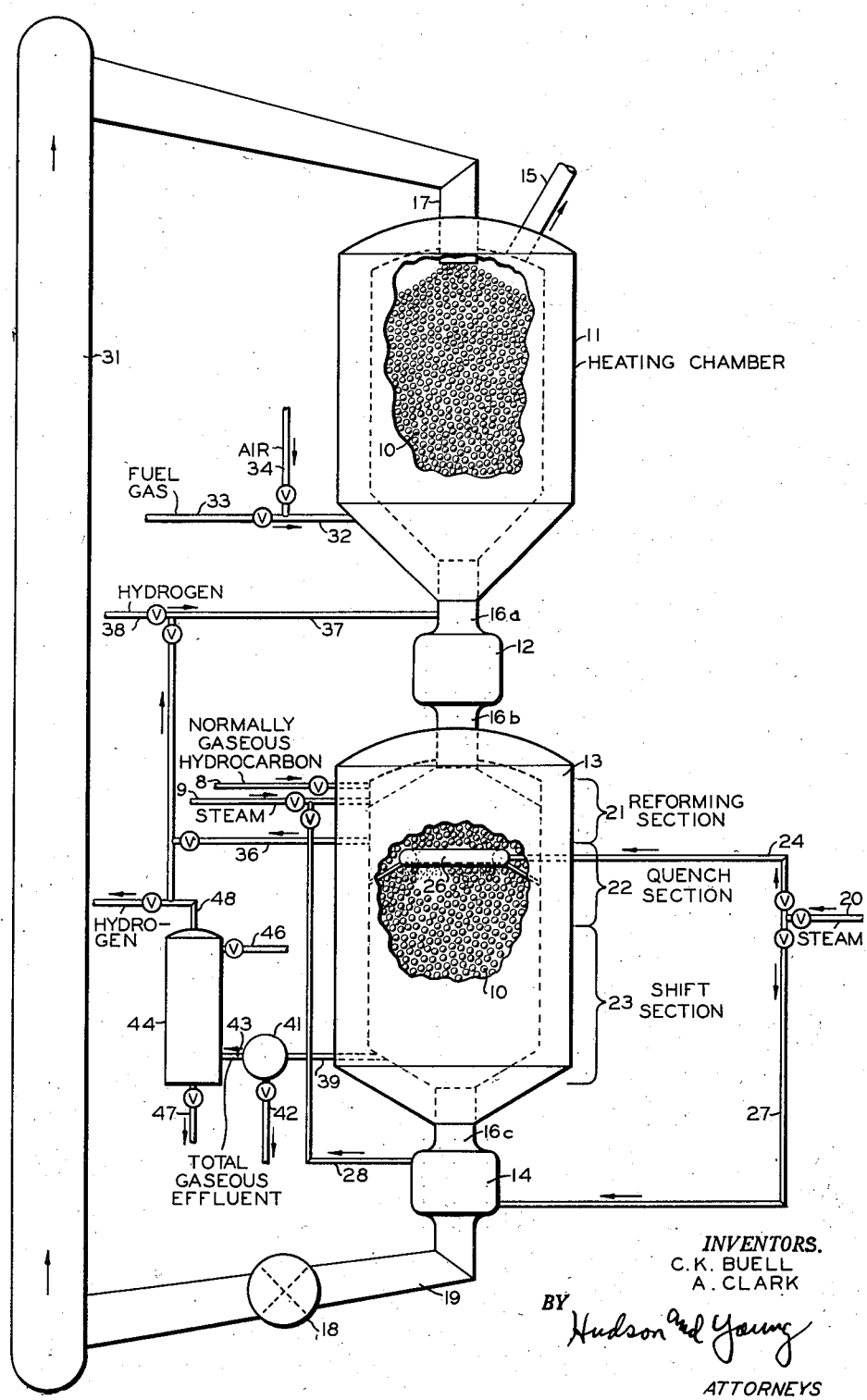

2,699,986

MANUFACTURE OF HYDROGEN

Charles K. Buell and Alfred Clark, Bartlesville, Okla., assignors to Phillips Petroleum Company, a corporation of Delaware Application November 17, 1950, Serial No. 196,232

12 Claims. (Cl. 23—212)

This invention relates to the manufacture of hydrogen. In one of its more specific aspects it relates to the utilization of a pebble heater type apparatus in the manufacture of hydrogen from hydrocarbons.

Various processes for the partial oxidation of hydrocarbons to form hydrogen and carbon monoxide have been advanced in the art. Among these are included the partial oxidation of a normally gaseous hydrocarbon with steam at elevated temperatures either catalytically or in the absence of a catalyst, the latter often being referred to as reforming. Conversion temperatures in such a process are generally within the limits of from about 1300 to 2000° F. or higher if desired, when employing a catalyst, and when operating in the absence of a catalyst, as high as 2500° F. Among the catalyst materials well known for their activity in such a reaction are included nickel or other metals of the iron group often mixed with supporting materials such as bauxite, Alundum, pumice, clays, and the like. Such a process in general has been conducted heretofore by passing a mixture of the hydrocarbon and steam through a fixed bed of the catalytic material under the temperature conditions described, together with associated conditions of pressure, time, contact, and the like.

Also well known in the prior art is the shift of the water gas equilibrium, that occurs in any mixture of hydrogen and carbon monoxide in response to certain temperature changes. As applied to effluents of a process for the manufacture of hydrogen and carbon monoxide, the final reaction product comprises four components, hydrogen, carbon dioxide, carbon monoxide, and water, which appear in the final mixture in accordance with the equilibrium reaction, $H_2 + CO_2 \rightleftarrows CO + H_2O$. As the temperature of the mixture is increased, the equilibrium is shifted toward $CO + H_2O$ side, and with a decrease in temperature, the equilibrium shifts toward the $CO_2 + H_2$ side and particularly good reaction rates are obtained in the presence of certain metal oxides active as catalysts therefor. In the manufacture of hydrogen plus carbon monoxide as "synthesis gas," it is desirable to direct the conditions of the process to favor the water gas equilibrium to the carbon monoxide side so that a minimum of carbon dioxide is formed, and to quickly quench the effluents to cool them to below a temperature at which the water gas shift causes undue $CO_2$ formation.

The partial oxidation of hydrocarbons in the presence of a metal as a catalyst together with the subsequent cooling of the effluents to favor the water gas shift equilibrium, in a separate vessel in the presence of an oxide of a different metal, to the $H_2 + CO_2$ side, followed by scrubbing out the $CO_2$ from the final product, has been utilized by workers in the art in the manufacture of hydrogen. This has been particularly feasible in view of the small amount of carbon monoxide remaining in the product when the synthesis gas product is "shifted" to form $CO_2$ at the expense of CO. Various conventional methods of scrubbing $CO_2$ from gases can be utilized to remove $CO_2$ from the shifted product to provide hydrogen in a high state of purity. Such conventional scrubbing methods include contacting the gas with aqueous ethanolamine, aqueous sodium carbonate, aqueous sodium hydroxide, or the like.

Heretofore in the manufacture of hydrogen in accordance with the general procedure above described, the practice has been to carry out the hydrocarbon conversion, i. e., "reforming," in the presence of a selected metal catalyst, and to then pass the effluents from the catalyst chamber to a different chamber and therein in the presence of an oxide of a different metal cause the desired shift equilibrium to take place, to the $CO_2 + H_2$ side. Such procedures involve high equipment requirements, much of the equipment necessarily being duplicated, as for example, pumps, lines, and the like, together with the need for an additional reaction chamber and controls associated with such duplicate installation.

Our invention is concerned with the manufacture of hydrogen from steam and hydrocarbons, in the presence of a downwardly moving mass of a solid particulate material, in a single reaction vessel, wherein the hydrocarbon and steam are converted to carbon monoxide and hydrogen, and the equilibrium of the resulting reaction mixture is caused to shift to the $H_2 + CO_2$ side. In carrying out our process we employ a pebble heater type apparatus.

The conventional pebble type heater apparatus often comprises two chambers which may be disposed in substantially vertical alignment. A solid heat exchange material is introduced into the upper portion of the first chamber. That material forms a moving bed of solid moving heat exchange material which flows downwardly through the chamber in direct heat exchange with hot gases. The solid heat exchange material is thereby heated to a high temperature, and is then passed to a second chamber in which the hot solid heat exchange material is caused to contact the gaseous reactant materials in a second direct heat exchange relation, furnishing heat for the treatment or conversion of the gaseous materials.

Solid heat exchange material which is conventionally used in pebble heater apparatus is generally called "pebbles." The term pebbles as used herein denotes any solid refractory material of flowable size and form, having strength, which is suitable to carry large amounts of heat from the pebble heating chamber to the reaction chamber without rapid deterioration or substantial breaking. Pebbles often used in pebble heater apparatus are substantially spherical in shape and range from about 1/8 inch to about 1 inch in diameter. In high temperature processes, such pebbles having a diameter of between about 1/4 inch and 3/8 inch are preferred. In any event, the pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material, may be utilized to form such pebbles. Silicon carbide, alumina, periclase, thoria, beryllia, stellite, zirconia, and mullite may be satisfactorily used to form such pebbles or may be used in admixture with each other or with other materials, particularly catalytic materials. Pebbles which are used may be either inert or catalytic, as used in any selected process.

An object of our invention is to provide a process for the manufacture of hydrogen. Another object is to provide for the manufacture of hydrogen from hydrocarbon and steam. Another object is to provide for the utilization of a pebble heater type apparatus in the manufacture of hydrogen in high yield and purity from a normally gaseous hydrocarbon and steam, in the presence of a single contiguous mass of particulate solids, in a single reaction chamber. Other objects will be apparent to one skilled in the art from the accompanying discussion and disclosure.

In accordance with a preferred embodiment of our invention, a contiguous fluent mass of particulate heat transfer-catalyst material comprising a metal and/or metal oxide is circulated through a heating chamber, a reducing chamber positioned below the heating chamber, and a reaction chamber positioned below the reducing chamber. The particulate mass is heated in the heating chamber and is contacted with a reducing gas in the reducing chamber to reduce oxide present on the particle surfaces. The hot reduced mass is contacted with steam and a hydrocarbon gas in an uppermost section of the reaction chamber under conditions of temperature, pressure, and time, to convert the hydrocarbon and steam to carbon monoxide and hydrogen, including carbon dioxide as principal reaction products; the total resulting gaseous product and particulate mass are passed concurrently downward through an intermediate section in the reaction chamber subjacent the uppermost section described, wherein they are contacted with relatively cool steam in an amount of steam and at a temperature to quench the mass and gases in contact therewith to a temperature favoring the reaction of steam with carbon monoxide to produce carbon dioxide and hydrogen, and to concomitantly oxidize the free metal of the particular mass. Total gases and quenched solids are passed in concurrent contact from the intermediate section into a subjacent and lowermost section of the reaction chamber and maintained in said contact therein for a time sufficient to cause shift of the water gas equilibrium to move to the $H_2+CO_2$ side, the carbon monoxide therein being substantially completely converted to carbon dioxide thereby forming additional amounts of carbon dioxide and hydrogen. A stream of the particulate solids mass is continuously withdrawn from a bottom portion of the reaction zone and returned to the heating chamber and recirculated through the system. Total gaseous effluents are withdrawn from a bottom portion of the reaction chamber, are cooled to condense water therefrom and scrubbed to remove carbon dioxide, to provide hydrogen of high purity and in high yield as a product of the process. The solids particulate mass is contiguous and extends from a point in the top of the heating chamber or in close proximity thereto on through the reducing and reaction chambers to a point therebelow from which the pebbles are removed and returned for recirculation through the system. The solids particulate material used in our process is in the form of at least one free metal selected from the group consisting of iron, cobalt, and nickel, at the time that it is passed through the uppermost section in the reaction chamber. When passed through the lowermost section it is in the form of an oxide of such a metal or metals, and when heated in the heating chamber it is generally in the form of its oxide. The material is reduced in the reducing zone to provide a free metal having activity as a catalyst in the conversion of a hydrocarbon and steam to carbon monoxide and hydrogen. The solids particulate mass introduced into the uppermost section of the reaction chamber may be of any desired form, such as metal or alloy balls, or a free metal disposed on a solid inert support, as for example on alumina, or disposed on a granular alumina support such as a bauxite or the like. In any case it is a free metal that is active as a catalyst in this step and the oxide thereof that is active as a catalyst in the shift reaction in the lowermost section of the reaction chamber.

For a further understanding of our invention reference is made to the attached drawing in which one embodiment is specifically illustrated. It is to be understood that the drawing is diagrammatic and may be altered in many respects by those skilled in the art and yet remain within the intended scope of our invention.

Referring then to the drawing, mass 10 is a downwardly moving contiguous mass of pebbles filling heating chamber 11, reducing chamber 12, reaction chamber 13, heat exchanger 14, interconnecting conduits 16a, 16b, and 16c, and solids outlet conduit 19, and extending from a point near the end of pebble inlet conduit 17 in the top of chamber 11 to feeder valve 18. Pebble mass 10 is introduced in the uppermost section 21 of chamber 13 and at that point comprises a metal of the group consisting of nickel, iron or cobalt, or if desired, a mixture of these metals. Particles of mass 10 entering section 21 can be metal balls or granules, or can comprise free metal or metals disposed on a granular solid inert carrier as for example nickel-on-alumina, iron-on-bauxite, or the like.

A normally gaseous hydrocarbon from line 8, preferably methane, is passed together with steam from line 9 into the uppermost section 21 of reaction chamber 13 and downwardly in concurrent flow and heat exchange relation therein with pebble mass 10, heated as described hereafter, to a temperature above 1300° F. and as high as 2000–2500° F., and comprising a free metal discussed hereinabove, as for example nickel. The mol ratio of steam to methane introduced into section 21 is preferably within the limits of 1.5:1 to 3.5:1. Under these conditions the hydrocarbon reacts endothermically with the steam to produce carbon monoxide and hydrogen together with some steam and carbon dioxide, the reaction temperature being at least 1300° F. and generally not higher than 2000° F. At such an elevated temperature the water gas equilibrium of the final product mixture is favorable to the steam+carbon monoxide side. Total gases are passed downwardly with pebbles gravitated from section 21, through a subjacent and intermediate section 22 in reaction chamber 13, and therein quenched to a temperature below 1300° F., preferably in the range of about 700 to 1100° F., by passing relatively cool steam in contact therewith, introduced through lines 20 and 24, and steam distribution ring 26. Under these conditions the free metal on the pebble surface in section 22 is concomitantly oxidized to an oxide. Quenched pebbles and total gases in section 22 are passed concurrently through subjacent and lowermost section 23 in reaction chamber 13 in contact with each other under which conditions of lowered temperature the shift of the water gas equilibrium of the gases is moved in the presence of the metal oxide sharply to the $H_2+CO_2$ side. Pebbles are withdrawn from a bottom portion of section 23 through conduit 16c and passed through heat exchange zone 14 directly to elevator 31, or preferably in direct heat exchange relation with steam from lines 20 and 27, to be preheated and then utilized as feed to section 21. Steam thus preheated is withdrawn from zone 14 through line 28 and is passed to section 21 through line 9. Pebbles are discharged from exchanger 14 through conduit 19 and pebble feeder means 18 of any desired type, such as a star valve, and returned through elevating means 31 and conduit 17 to heating chamber 11 for recirculation through the system. Pebbles entering chamber 11 through conduit 17 contain the metal oxide on their surfaces, and in that form are heated while gravitating through chamber 11 in countercurrent flow and heat exchange relation with relatively hot combustion gases formed by burning fuel gas and air in a lower portion of chamber 11, introduced thereinto through lines 32 and lines 33 and 34 respectively. Effluent heat exchange gases, having imparted heat to pebbles in chamber 11, are discharged therefrom through line 15. The combustion temperature in chamber 11 is regulated by adjusting the proportions of air and fuel gas introduced thereinto, which are selected to provide a combustion temperature above 1300° F. and preferably within the limits of about 2000–2500° F., dependent on the desired pebble temperature and the amount of combustion gas available. The actual selection of pebble temperature developed in chamber 11 is dependent also on the quantity of pebbles available for transferring heat to the reactants in section 21. We heat the pebble mass to a temperature higher than that required in the conversion reaction in section 21 of chamber 13, generally from 100 to 500° F. higher.

Heated pebbles are gravitated from chamber 11 through conduit 16a and comprise an oxide of the metal, as a result of the oxidation in section 22 and any further oxidation taking place in chamber 11, although some free metal can be present as added make-up pebbles. Pebbles are passed from conduit 16a through reducing zone 12 and contacted therein in any desired manner with a reducing gas to convert the metal oxide pebble surfaces to the free metal. We have found it advantageous to withdraw a portion of the total gas product formed in section 21 through line 36 and to pass same through line 37 into conduit 16a as a gas seal, and also so as to pass concurrently through reducing zone 12 to serve as the reducing gas to convert the pebble oxide surfaces to the free metal. However, when desired, hydrogen from any desired source can be introduced into conduit 16a through lines 37 and 38. Gaseous effluent from chamber 12 is then permitted to pass downwardly into section 21.

Total gaseous effluent is withdrawn from a bottom portion of section 23 and is treated in accordance with well known procedures for recovering hydrogen in any desired state of purity from such a stream. In one manner, the effluent is withdrawn through line 39 and passed through cooler 41 to condense steam therein. Steam condensate is withdrawn through line 42. Relatively dry gas is passed from cooler 41 through line 43 into a bottom portion of absorption vessel 44, wherein it is contacted countercurrently with an aqueous absorption medium introduced into absorption chamber 44 through line 46, such a suitable medium being, as for example, aqueous ethanolamine, aqueous sodium carbonate, or the like. Enriched absorbent is withdrawn from chamber 44 through line 47, and hydrogen of high purity is withdrawn from absorption chamber 44 through line 48 as a product of the process. It is sometimes desirable to withdraw a portion of the hydrogen from line 48 and to recycle same to reducing zone 12 as the reducing gas.

In the foregoing description, various pumps, valves, and other conventional type equipment have been omitted for the purpose of clarity. Obviously such modifications of the present invention can be practiced without departing from the scope of the invention.

The advantages of this invention are illustrated in the following example. The reactants and their proportions and their specific ingredients are presented as being typical and should not be construed to limit the invention unduly.

Methane is burned with air in a pebble heating chamber on the pebble surfaces of a downwardly moving contiguous pebble mass containing nickel on its pebble surfaces. The pebbles are prepared by impregnating alumina balls with nickel nitrate and thermally decomposing the nitrate to provide the finished nickel-coated pebbles. The impregnated catalyst contains from about 0.5 to 10 weight per cent nickel. The proportions of air and methane are regulated to produce a combustion temperature of about 2500° F., when burned, and are introduced into the heating chamber at a rate to heat the pebble mass to a temperature of about 2300° F. During the burning the pebble surfaces are converted in at least a large part to nickel oxide.

The contiguous pebble mass at 2300° F. is gravitated from the bottom of the pebble heating chamber through a throat and therein contacted at its existing temperature of 2300° F. with a hydrogen-containing stream described hereafter, to reduce the metal oxide on the pebble surfaces to the metal. The reaction with hydrogen is slightly exothermic and there is very little heat loss in the reduction, so that the temperature of the moving pebble mass discharged from the reducing zone is not greatly decreased. When utilizing hydrogen without first preheating it, the temperature of the pebble mass is not seriously decreased in the reducing zone, in view of the relatively small amount of hydrogen required.

The pebble mass is gravitated from the bottom of the reducing zone at about 2200-2300° F. through a subjacent reaction zone. Methane and steam are introduced into an uppermost section of the reaction zone into concurrent flow with the downwardly moving pebbles in a mol ratio of steam to methane of about 2:1. Under these conditions an endothermic reaction of steam with methane is initiated to form carbon monoxide and hydrogen. A side stream of hydrogen and carbon monoxide is withdrawn from a lower portion of the uppermost section, and returned to the reducing zone as said hydrogen-containing stream. Effluent gases from the reducing zone are passed downwardly into the reaction zone. The contiguous pebble mass is introduced into the reaction zone at a rate of 450 pounds per mol of methane fed in contact therewith. The reaction is highly endothermic, the heat required being about 122,000 B. t. u. per mol of methane initially fed into the reaction zone. Pebbles and gases are passed concurrently from the uppermost section at a temperature at about 1300° F., and then on through a subjacent section in the reaction chamber. The pebble mass in the subjacent section, together with the total gaseous product in contact therewith, is quenched with 250° F. steam, to about 800° F. About 16.2 pounds mols of 250° F. steam per mol of methane feed is required for the quenching step. In this manner the pebbles are quenched and the metal on the pebble surfaces is concomitantly re-oxidized. The pebbles are thus suitable for catalyzing a shift of the water gas equilibrium to the $H_2+CO_2$ side, at the temperature of the quenched pebble mass. Steam added as quench, by its presence, also influences the shift of the water gas equilibrium to the $H_2+CO_2$ side.

Total gases are maintained in contact with the metal oxide-coated pebbles in the lowermost section of the reaction zone during which time $CO_2$ and hydrogen are formed therein at the expense of CO and steam.

Total effluent gases are withdrawn from the bottom of the lowermost section and are treated with an aqueous ethanolamine for the absorption of $CO_2$ therefrom to produce hydrogen of about 95 per cent purity.

Pebbles at 800° F. are discharged from the lower end of the reaction zone and are passed in heat exchange relation with steam to preheat same prior to introduction to the uppermost section of the reaction chamber with methane feed, and are withdrawn from the heat exchange at a temperature of 730° F. and returned to the pebble heating chamber for recirculation through the system.

The relative volumes of the uppermost section and the lowermost section are in a ratio of 1:2 so that the methane feed can be introduced into the uppermost section at a space velocity of about 300 volumes per volume of pebbles therein per hour, and to provide for a space velocity (dry gas) of total gases in the lowermost section of 450 volumes per volume of pebbles therein per hour.

The entire system is operated under a pressure of from about 1 to 10 p. s. i. g.

As will be evident to those skilled in the art, various modifications can be made or followed, in the light of the foregoing disclosure and discussion, without departing from the spirit or scope of the disclosure or from the scope of the claims.

We claim:

1. A process for the utilization of a pebble heater system in the manufacture of hydrogen, comprising gravitating a pebble mass comprising alumina pebbles containing at least one free metal of the group consisting of iron, nickel, and cobalt on their surfaces, at a temperature above 1300° F. and not exceeding 2500° F., through an uppermost section of a reaction zone; flowing steam and methane in an initial mol ratio of steam to methane within the limits of 1:1 and 4:1 through said uppermost section in concurrent flow and heat exchange relation with the pebble mass therein, whereby said methane and steam react to form carbon monoxide and hydrogen; gravitating said pebble mass and concurrently passing therewith total gases from said uppermost section to a subjacent and intermediate section in said reaction zone; passing relatively cool steam into said intermediate section to quench said pebble mass and gases therein to a temperature within the limits of 700 and 1100° F. and to concomitantly oxidize at least a portion of the pebble surfaces therein to a metal oxide; gravitating said mass of pebbles from said intermediate section and concurrently passing total gases therefrom through a subjacent and lowermost section of said reaction zone, at a temperature within the last said temperature range to convert steam and carbon monoxide, by water gas shift, in said lowermost section to hydrogen and carbon dioxide, in contact with metal oxide therein as a catalyst for said shift; withdrawing pebbles from a bottom portion of said lowermost section and passing same to a pebble heating zone disposed above said reaction zone to form a pebble mass therein; gravitating pebbles through said pebble heating zone; passing a hot heat exchange gas through said pebble heating zone in countercurrent flow and heat exchange relation with said pebbles therein so as to heat same to a temperature higher than that of pebbles initially introduced into said reaction zone; gravitating heated pebbles from said pebble heating zone through a reducing zone intermediate said heating and reaction zones and therein contacting said pebbles with hydrogen at a temperature higher than that of pebbles initially introduced into said reaction zone, whereby heated pebble surfaces are reduced to free metal; gravitating pebbles containing free metal on their surfaces from said reducing zone to said reaction zone as said pebbles above 1300° F. and not exceeding 2500° F. described above; passing gaseous effluents from said reducing zone downwardly through said reaction zone; pebbles in said heating zone, in said reducing zone, and in said reaction zone forming a single contiguous particulate mass; withdrawing total gaseous effluent from a bottom portion of said lowermost section and recovering therefrom hydrogen free of steam and carbon dioxide; recycling a portion of the recovered hydrogen as said hydrogen introduced into said reducing zone; and recovering a remaining portion of said recovered hydrogen as a product of the process.

2. The process of claim 1 wherein said free metal is nickel.

3. The process of claim 1 wherein said free metal is iron.

4. The process of claim 1 wherein said solids mass comprises spherical balls.

5. The process of claim 1 wherein said free metal comprises balls of an iron-nickel alloy.

6. A process for the manufacture of hydrogen comprising gravitating a contiguous particulate mass of pebbles containing at least one free metal of the group consisting of iron, nickel and cobalt on their surfaces at a temperature above 1300° F. and not exceeding 2500° F. through an uppermost section of a reaction zone; passing steam and a normally gaseous hydrocarbon through said uppermost section in concurrent flow and heat exchange relation with said solids mass therein so as to react said steam with said normally gaseous hydrocarbon to form carbon monoxide and hydrogen; concurrently passing total gases and said solids mass downwardly from said uppermost section through a subjacent and intermediate section of said reaction zone; passing steam into said intermediate section at a temperature lower than 1300° F. to quench said solids mass and gases in contact therewith to a temperature favoring the equilibrium shift of components in the gases contacted in said intermediate section, to the $H_2$ and $CO_2$ side, and concomitantly oxidizing at least a portion of free metal on said pebble surfaces; gravitating said quenched pebbles and total gases from said intermediate section through a lowermost section of said reaction zone at a temperature favoring said shift, whereby carbon monoxide and steam in the last said section are converted to hydrogen and carbon dioxide, withdrawing pebbles from a bottom portion of said lowermost section and passing same to a pebble heating zone disposed above said reaction zone to form a pebble mass therein and gravitating pebbles through said heating zone while heating the last said pebbles to a temperature higher than that of pebbles initially introduced into said reaction zone; gravitating heated pebbles from said heating zone through a reducing zone intermediate said heating and reaction zones and therein reducing free metal oxide on said pebbles to free metal; gravitating the last said pebbles containing free metal from said reducing zone downwardly through said reaction zone as said pebble mass containing free metal, as described hereinabove, and recovering hydrogen from total gaseous effluents from said reaction zone as a product of the process.

7. The process of claim 6 wherein hydrogen is passed in contact with pebbles in said reducing zone to effect said reducing, and at least a portion of the last said hydrogen comprises hydrogen recovered from gaseous effluents from said lowermost zone.

8. The process of claim 6 wherein said free metal is cobalt.

9. A process for the production of hydrogen comprising gravitating a contiguous particulate mass of fluent solids previously heated to a temperature above 1300° F. and comprising at least one free metal of the group consisting of iron, cobalt and nickel through an uppermost section of a reaction zone; passing steam and a normally gaseous hydrocarbon through said uppermost section in concurrent flow and heat exchange relation with said solids mass therein under time conditions providing for reaction of said steam with said hydrocarbon to form carbon monoxide, carbon dioxide and hydrogen as the principal reaction products; concurrently gravitating total gases and said solids mass downwardly from said uppermost section through a subjacent and intermediate section of said reaction zone, and passing additional steam into said intermediate section at a temperature in the range of 700–1300° F. in an amount sufficient to quench said solids mass and gases in contact therewith to a temperature favoring the equilibrium shift of components in the gases contacted to the $H_2+CO_2$ side and to concomitantly oxidize free metal in the quenched solids mass to oxide as catalyst for said shift; gravitating quenched solids mass and total gases from said intermediate section through a lowermost section of said reaction zone at a temperature within the last said temperature range and maintaining contact of gases with solids, in said lowermost section, for a time sufficient to react carbon monoxide with steam therein to form additional amounts of hydrogen and carbon dioxide; and recovering hydrogen from effluents from said lowermost section as product of the process.

10. The process of claim 9 wherein said contiguous particulate mass of solids is introduced into said uppermost section of said reaction zone at a temperature within the limits of 2000 and 2500° F.

11. A process for the production of hydrogen, comprising passing a contiguous particulate mass of fluent solids at an initial temperature above 1300° F., and not exceeding 2500° F. and comprising at least one free metal of the group consisting of iron, cobalt and nickel downwardly through an uppermost section of a reaction zone in concurrent flow and heat exchange relation with steam and a normal gaseous hydrocarbon under time conditions providing for reaction of said steam with said hydrocarbon to form carbon monoxide, carbon dioxide and hydrogen as the principal reaction products; passing total gases and solids downwardly from said uppermost section and adding additional steam to the said total gases and solids at a temperature in the range of 700–1300° F. in an amount sufficient to quench said gases and solids to a temperature favoring reaction of carbon monoxide with steam to produce carbon dioxide and hydrogen in presence of an oxide of at least one of said free metals and to concomitantly oxidize free metal in said particulate mass; passing resulting total mixture of added steam with gases and solids into a subjacent and intermediate section in said zone and therein maintaining contact of gases with solids in the last said mixture for a time sufficient to effect said quench and oxidation of solids; passing resulting mixture of quenched gases and oxidized solids into a lowermost section of said reaction zone and therein maintaining the last said mixture of steam and gases in contact with said oxidized solids for a time sufficient to effect said reaction of carbon monoxide with steam to form additional amounts of hydrogen and carbon dioxide; and recovering hydrogen from effluents from said lowermost section, as product of the process.

12. A process for the production of hydrogen, comprising passing a contiguous particulate mass of fluent solids comprising at least one free metal of the group consisting of iron, cobalt and nickel downwardly through an uppermost section of a reaction zone in concurrent flow and heat exchange relation with steam and a gaseous hydrocarbon under time and temperature conditions for reacting the said steam with said hydrocarbon in presence of said free metal to form carbon monoxide, carbon dioxide and hydrogen as the principal reaction products; passing total gases and solids downwardly from said uppermost section and adding additional steam to the said total gases and solids at a temperature and in an amount sufficient to quench said gases and solids to a temperature favoring reaction of carbon monoxide with steam to produce carbon dioxide and hydrogen in presence of an oxide of at least one of said free metals and to concomitantly oxidize said free metal; passing resulting total mixture of added steam, gases and solids into a subjacent and intermediate section in said zone and therein maintaining the last said mixture for a time sufficient to effect said quench and oxidation of solids; passing resulting mixture of quenched gases, steam and oxidized solids into a lowermost section of said reaction zone and therein maintaining steam and said gases in contact with oxidized solids for a time sufficient to effect said reaction of carbon monoxide with steam to form additional amounts of hydrogen and carbon dioxide; and recovering hydrogen from effluents from said lowermost section, as product of the process.

References Cited in the file of this patent

UNITED STATES PATENTS

| Number | Name | Date |
|---|---|---|
| 1,904,593 | Young et al. | Apr. 18, 1933 |
| 1,915,363 | Hanks et al. | June 27, 1933 |
| 2,548,286 | Bergstrom | Apr. 10, 1951 |